(12) United States Patent
Pyne

(10) Patent No.: US 10,794,357 B1
(45) Date of Patent: Oct. 6, 2020

(54) CONICAL WIND TURBINE ASSEMBLY

(71) Applicant: Kevin Pyne, Walnut Creek, CA (US)

(72) Inventor: Kevin Pyne, Walnut Creek, CA (US)

( * ) Notice: Subject to any disclaimer, the term of this patent is extended or adjusted under 35 U.S.C. 154(b) by 0 days.

(21) Appl. No.: 16/837,199

(22) Filed: Apr. 1, 2020

(51) Int. Cl.
*F03D 1/00* (2006.01)
*F03D 15/00* (2016.01)
*F03D 1/06* (2006.01)
*F03D 9/25* (2016.01)
*F03D 7/02* (2006.01)

(52) U.S. Cl.
CPC ......... *F03D 1/0625* (2013.01); *F03D 1/0658* (2013.01); *F03D 1/0666* (2013.01); *F03D 7/0204* (2013.01); *F03D 9/25* (2016.05); *F05B 2220/706* (2013.01); *F05B 2240/221* (2013.01)

(58) Field of Classification Search
CPC .... F03D 1/0625; F03D 1/0633; F03D 1/0608; F03D 1/06; F03D 1/0658; F03D 1/0666; F03D 7/00; F03D 7/0204; F03D 9/34; F03D 9/25; F05B 2220/706; F05B 2240/221
See application file for complete search history.

(56) References Cited

U.S. PATENT DOCUMENTS

| | | | | |
|---|---|---|---|---|
| 833,184 A * | 10/1906 | Terzian | ..................... | F03D 1/04 415/4.5 |
| 1,321,415 A * | 11/1919 | Brown | .......................... | 416/118 |
| 1,646,723 A * | 10/1927 | Bonetto | ................... | F03D 80/00 415/4.2 |
| 1,699,949 A * | 1/1929 | Bucklen | ................. | H02K 7/183 290/55 |
| 1,783,669 A * | 12/1930 | Oliver | ..................... | F03D 1/025 415/4.5 |
| 3,988,072 A * | 10/1976 | Sellman | ................ | F03D 3/0463 415/2.1 |
| 4,017,204 A * | 4/1977 | Sellman | ................ | F03D 3/0463 415/4.4 |
| 4,021,135 A * | 5/1977 | Pedersen | ................... | F03D 1/04 415/208.2 |
| 4,074,951 A * | 2/1978 | Hudson | ................. | F03D 3/0463 415/2.1 |
| 4,127,356 A * | 11/1978 | Murphy | ................ | F03D 3/0463 415/4.1 |
| 4,140,433 A * | 2/1979 | Eckel | ........................ | F03D 1/02 415/209.1 |
| 4,316,699 A * | 2/1982 | Schott | ................... | F03D 7/0224 416/139 |

(Continued)

*Primary Examiner* — Tulsidas C Patel
*Assistant Examiner* — S. Mikailoff

(57) ABSTRACT

A conical wind turbine assembly includes a stand that is positionable in an area known for regularly occurring windy conditions. The stand includes a rotatable supporting element that is rotatable around the stand to align the rotatable supporting element with a direction of the wind. A generator is coupled to the stand and the generator is in mechanical communication with the rotatable supporting element. A plurality of fins is each coupled to the rotatable supporting element to be exposed to the wind. Each of the fins radiates around the rotatable supporting element to capture the wind thereby rotating the fins. Additionally, each of the fins is in mechanical communication with the generator such that the generator is rotated when the fins are rotated wherein the fins are configured to convert wind energy into electrical energy.

12 Claims, 4 Drawing Sheets

(56) References Cited

U.S. PATENT DOCUMENTS

| | | | | |
|---|---|---|---|---|
| 4,360,315 A * | 11/1982 | Olson | | F03D 1/0608 416/132 B |
| 4,729,716 A * | 3/1988 | Schmidt | | F03D 13/20 416/10 |
| D305,419 S * | 1/1990 | Korneski | | D13/115 |
| 5,977,649 A * | 11/1999 | Dahill | | F03D 1/04 290/55 |
| 6,239,507 B1 * | 5/2001 | Douthit | | F03D 13/20 290/55 |
| 6,786,697 B2 * | 9/2004 | O'Connor | | F03D 1/04 416/189 |
| 6,841,892 B1 * | 1/2005 | Le Nabour | | F03D 80/60 290/43 |
| 6,981,839 B2 * | 1/2006 | Fan | | F03D 3/0427 415/4.1 |
| 7,044,713 B2 * | 5/2006 | Joo | | F03D 1/025 416/201 A |
| 7,176,584 B1 * | 2/2007 | Green | | F03D 1/04 290/55 |
| 7,679,206 B1 * | 3/2010 | Green | | F03D 1/04 290/44 |
| 8,106,528 B2 * | 1/2012 | Liu | | F03D 7/0204 290/55 |
| 8,164,210 B2 * | 4/2012 | Boone | | F03D 3/005 290/55 |
| 9,046,080 B2 | 6/2015 | Sliwa | | |
| 9,521,830 B2 | 12/2016 | Wenger | | |
| 9,581,165 B2 | 2/2017 | Babbitt | | |
| 9,587,623 B2 * | 3/2017 | Christoffersen | | F03D 7/0228 |
| 10,100,804 B2 * | 10/2018 | Haahr | | F03D 7/0224 |
| D856,844 S | 8/2019 | Lee | | |
| 2011/0006536 A1 * | 1/2011 | Liu | | F03D 13/20 290/55 |
| 2011/0109088 A1 * | 5/2011 | Cook | | F03B 3/126 290/52 |
| 2011/0167687 A1 | 7/2011 | Winkler | | |
| 2013/0315732 A1 * | 11/2013 | Sutz | | F03D 1/0625 416/9 |
| 2015/0159624 A1 * | 6/2015 | Haahr | | F03D 1/0658 416/205 |
| 2015/0369213 A1 * | 12/2015 | Jakobsson | | F03D 15/10 416/153 |
| 2015/0371575 A1 | 12/2015 | Carl | | |
| 2017/0342966 A1 | 11/2017 | Barber | | |
| 2018/0216599 A1 * | 8/2018 | Sutz | | F03D 15/00 |
| 2019/0242359 A1 | 8/2019 | Rider | | |
| 2019/0242363 A1 * | 8/2019 | Franck | | F03D 5/04 |
| 2019/0307117 A1 | 10/2019 | Dwyer | | |

\* cited by examiner

CONICAL WIND TURBINE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to turbine devices and more particularly pertains to a new turbine device for converting wind energy into electrical energy.

(2) Description of Related Art Including Information Disclosed Under 37 CFR 1.97 and 1.98

The prior art relates to turbine devices including an optical imager device for curtailing operation of wind turbines when airborne animals are approaching a wind turbine. The prior art discloses a wind turbine with a plurality of light emitters for producing an image by persistence of vision effect. The prior art discloses a wind turbine airbag system that includes airbags that are coupled to blades of a wind turbine for inflating to inhibit a bird from being killed by striking the blades. The prior art discloses a detection array surrounding a collection of wind turbines for turning of the wind turbines when the detection array detects animals approaching the collection of wind turbines. The prior art also discloses wind turbine that has imagery printed on the blades for producing a moving image when the wind turbine rotates.

BRIEF SUMMARY OF THE INVENTION

An embodiment of the disclosure meets the needs presented above by generally comprising a stand that is positionable in an area known for regularly occurring windy conditions. The stand includes a rotatable supporting element that is rotatable around the stand to align the rotatable supporting element with a direction of the wind. A generator is coupled to the stand and the generator is in mechanical communication with the rotatable supporting element. A plurality of fins is each coupled to the rotatable supporting element to be exposed to the wind. Each of the fins radiates around the rotatable supporting element to capture the wind thereby rotating the fins. Additionally, each of the fins is in mechanical communication with the generator such that the generator is rotated when the fins are rotated wherein the fins are configured to convert wind energy into electrical energy.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
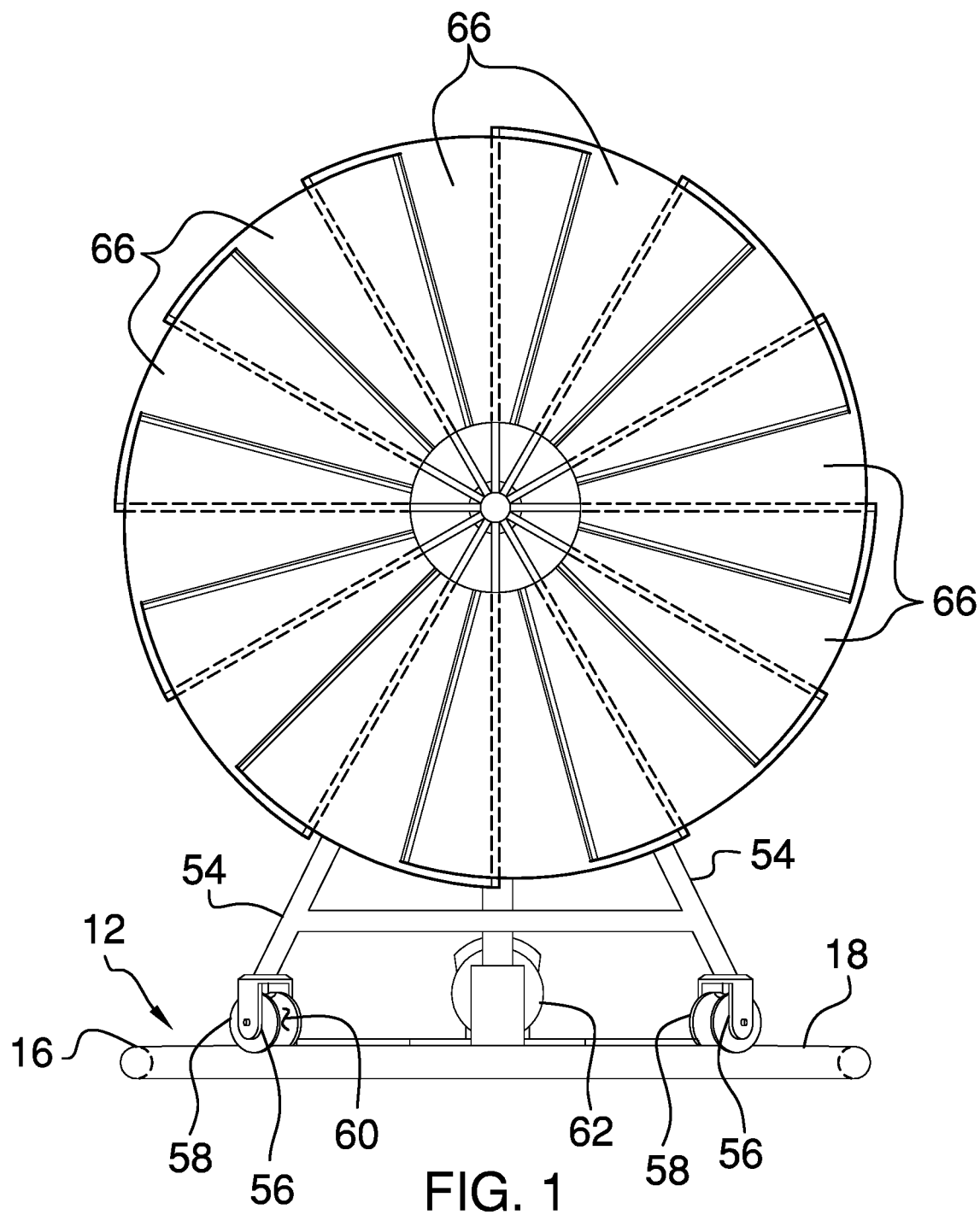
FIG. 1 is a front phantom view of a conical wind turbine assembly according to an embodiment of the disclosure.
Figure 2:
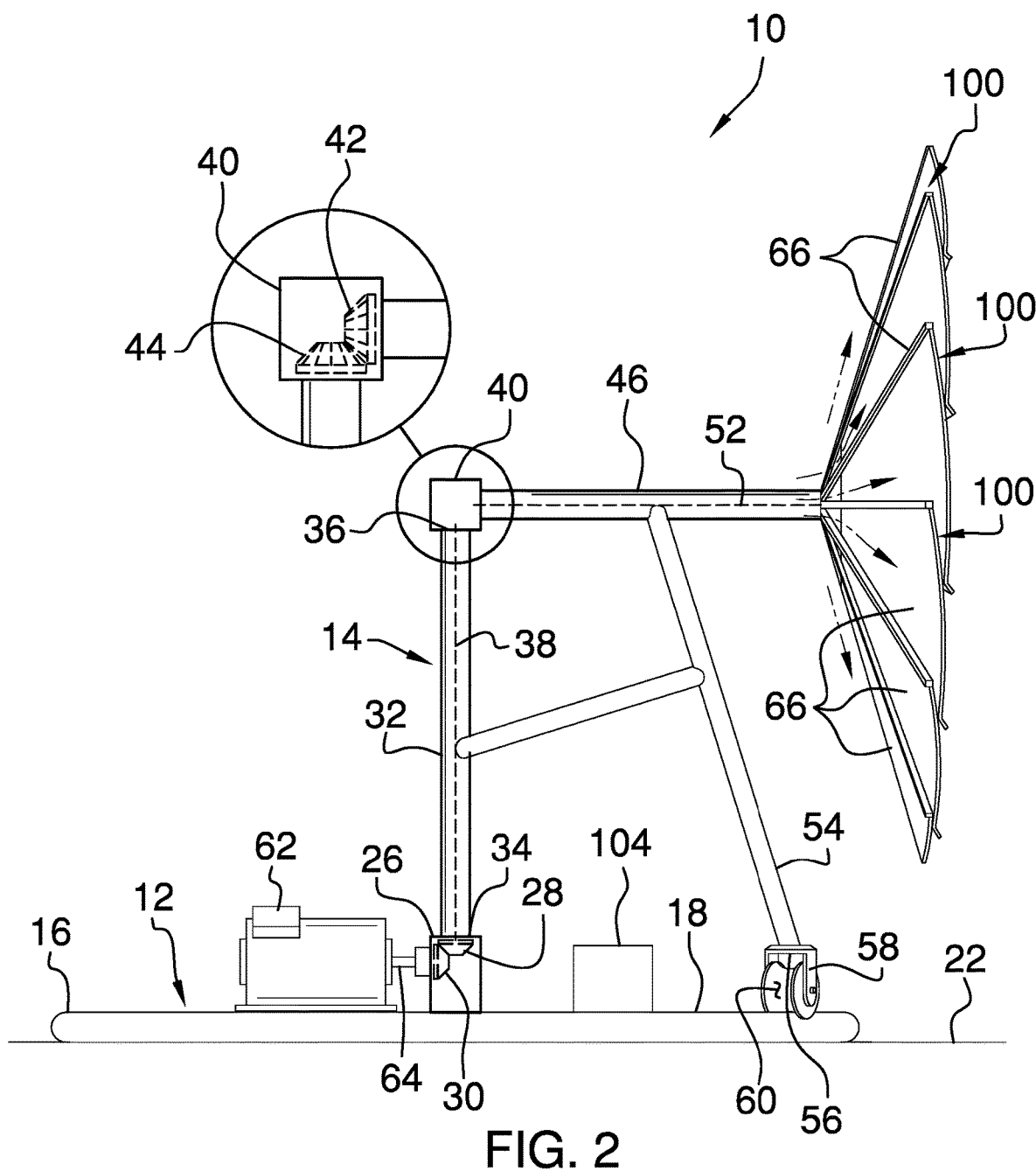
FIG. 2 is a right side in-use view of an embodiment of the disclosure.
Figure 3:
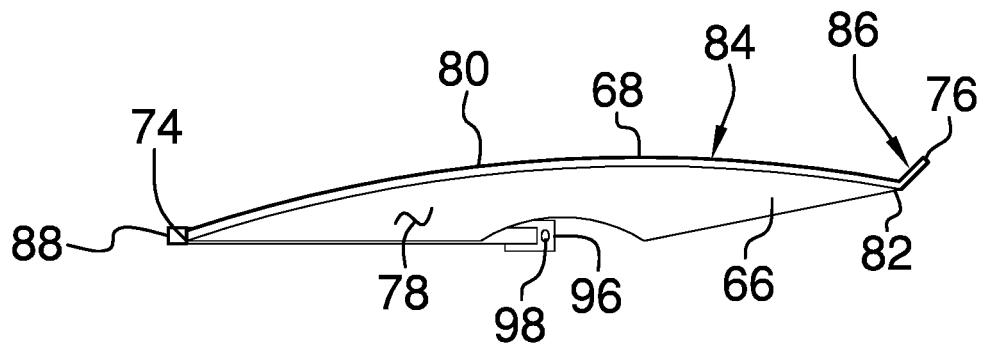
FIG. 3 is a top view of a fin of an embodiment of the disclosure.
Figure 4:
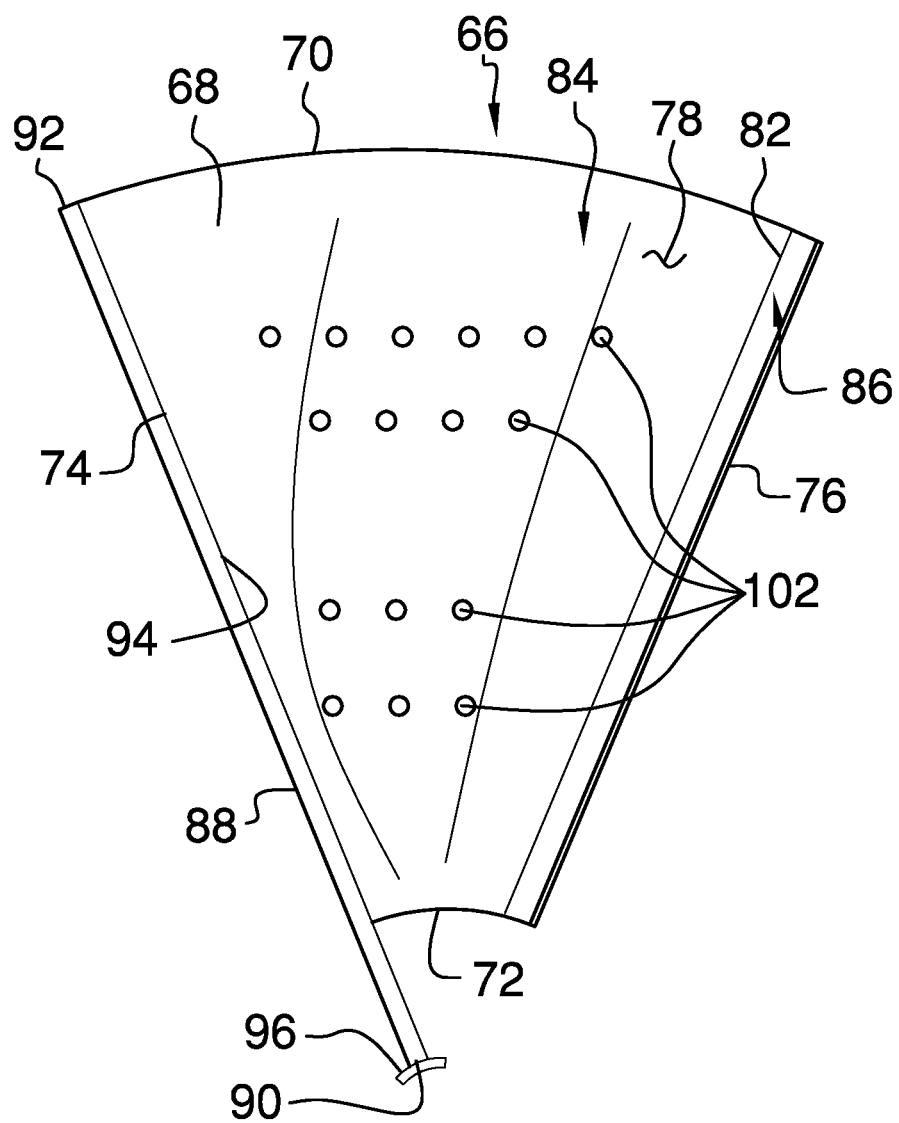
FIG. 4 is a front view of a fin of an embodiment of the disclosure.
Figure 5:
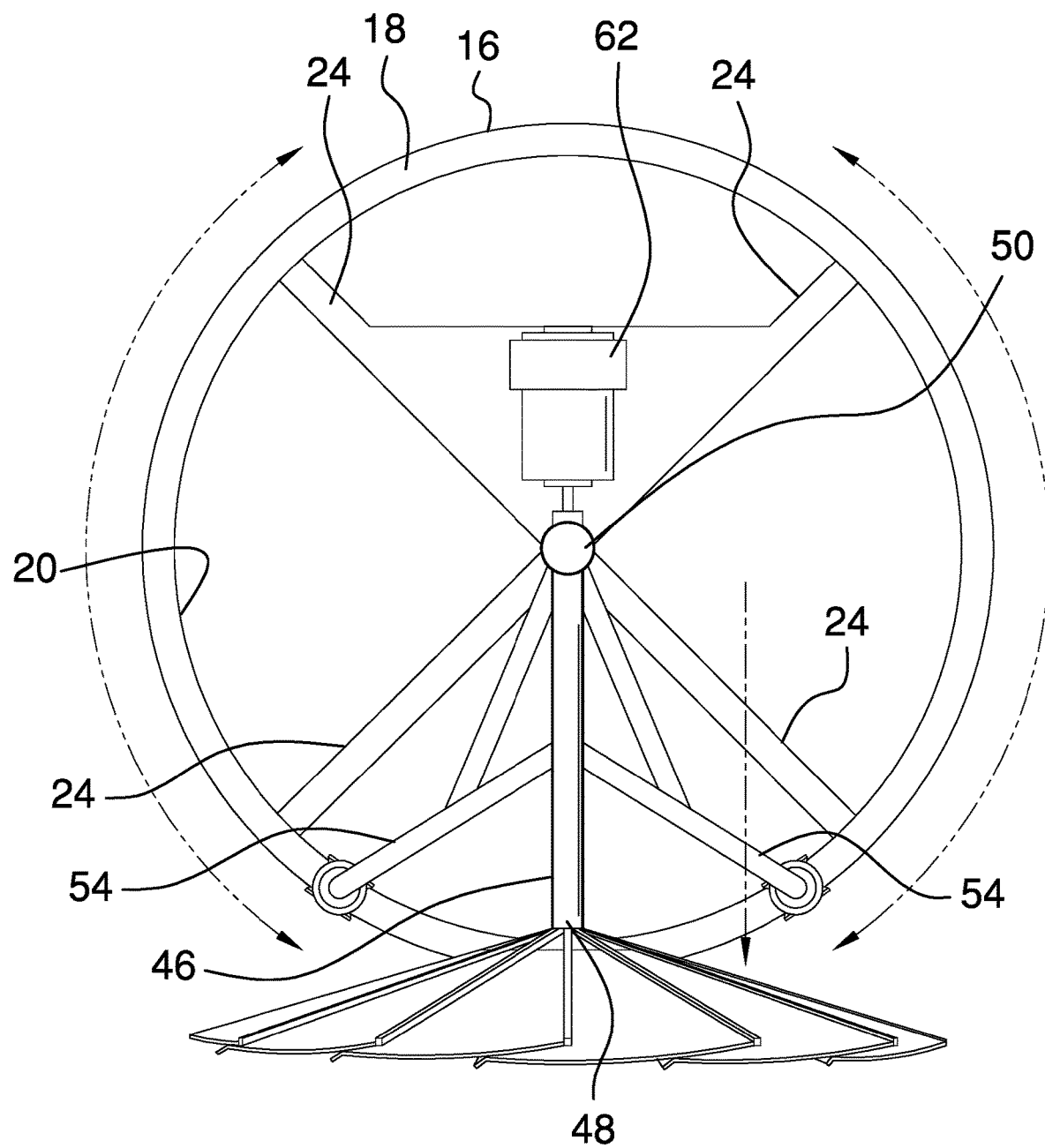
FIG. 5 is a top view of an embodiment of the disclosure.

With reference now to the drawings, and in particular to FIGS. 1 through 5 thereof, a new turbine device embodying the principles and concepts of an embodiment of the disclosure and generally designated by the reference numeral 10 will be described.

As best illustrated in FIGS. 1 through 5, the conical wind turbine assembly 10 generally comprises a stand 12 that is positionable in an area known for regularly occurring windy conditions. The stand 12 includes a rotatable supporting element 14 and the rotatable supporting element 14 is rotatable around the stand 12. In this way the rotatable element 14 can be aligned with a direction of the wind. The stand 12 comprises a ring 16 that has a top side 18 and an inwardly facing side 20, and the ring 16 is positionable to lie on a support surface 22. The stand 12 comprises a plurality of supports 24 that is each coupled to the inwardly facing side 20 of the ring 16. Each of the supports 24 extends across a full diameter of the ring 16 for supporting the circular shape of the ring 16. Moreover, each of the supports 24 intersects each other at a center point of the ring 16.

The rotatable supporting element 14 comprises a first gear box 26 that is coupled to the supports 24 and the first gear box 26 is aligned with the center point of the ring 16. The first gear box 26 has an input 28 and an output 30, and the input 28 has a rotational axis that is oriented perpendicular to a rotational axis of the output 30. The rotatable supporting element 14 includes a first tube 32 that has a lower end 34 and an upper end 36. The lower end 34 engages the first gear box 26 such that the first tube 32 is vertically oriented. Additionally, the rotatable supporting element 14 comprises a first shaft 38 that is rotatably positioned within the first tube 32 and the first shaft 38 rotatably engages the input 28 of the first gear box 26.

The rotatable supporting element 14 includes a second gear box 40 that is coupled to the upper end 36 of the first tube 32, and the second gear box 40 has an input 42 and an output 44. The input 42 of the second gear box 40 has a rotational axis that is oriented perpendicular to a rotational axis of the output 44 of the second gear box 40. The first shaft 38 engages the output 44 of the second gear box 40 such that the first gear box 26 is in mechanical communication with the second gear box 40. The rotatable supporting element 14 includes a second tube 46 that has a front end 48 and a back end 50, and the back end 50 engages the second gear box 40 such that the second tube 46 is horizontally oriented.

The rotatable supporting element 14 includes a second shaft 52 that is rotatably positioned within the second tube 46. The second shaft 52 rotatably engages the input 28 of the second gear box 40 such that the second shaft 52 is in mechanical communication with the first shaft 38. The rotatable supporting element 14 includes a pair of legs 54 and each of the legs 54 is coupled to and extends downwardly from the second tube 46. Each of the legs 54 has a distal end 56 with respect to the second tube 46. Each of the legs 54 angles away from the second tube 46 such that the distal end 56 of each of the legs 54 is aligned with the top side 18 of the ring 16.

The rotatable supporting element 14 includes a pair of rollers 58 that is each rotatably coupled to the distal end 56 of a respective one of the legs 54. Each of the rollers 58 engages the top side 18 of the ring 16 such that the first tube 32 and the second tube 46 are rotatable about the center point of the ring 16. Each of the rollers 58 has a concavely arcuate rolling surface 60 for conforming to the curvature of the ring 16. A generator 62 is coupled to the stand 12 and the generator 62 is in mechanical communication with the rotatable supporting element 14. The generator 62 has an input shaft 64 and the input shaft 64 engages the output 30 of the first gear box 26 such that the first gear box 26 rotates the generator 62 to produce electrical energy.

A plurality of fins 66 is provided and each of the fins 66 is coupled to the rotatable supporting element 14. In this way each of the fins 66 is exposed to the wind. Each of the fins 66 radiates around the rotatable supporting element 14 to capture the wind thereby rotating the fins 66. Each of the fins 66 is oriented to angle forwardly from the rotatable supporting element 14 such that the plurality of fins 66 forms a cone. Each of the fins 66 is in mechanical communication with the generator 62 such that the generator 62 is rotated when the fins 66 are rotated. In this way the generator 62 converts wind energy into electrical energy.

Each of the fins 66 comprises a panel 68 that has a top edge 70, a bottom edge 72, a first lateral edge 74, a second lateral edge 76, a front surface 78 and a back surface 80. The panel 68 is elongated between the top edge 70 and the bottom edge 72. Moreover, the bottom edge 72 has a length that is less than the length of the top edge 70 such that panel 68 has a wedge shape. The panel 68 has a bend 82 extending between the top edge 70 and the bottom edge 72. The bend 82 is spaced from the first lateral edge 74 to define a first portion 84 of the panel 68 forming an angle with a second portion 86 of the panel 68. Additionally, the first portion 84 of the panel 68 is concavely arcuate with respect to the front surface 78 and the back surface 80.

Each of the fins 66 includes a rod 88 has a first end 90, a second end 92 and a first surface 94 extending between the first end 90 and the second end 92. The rod 88 is elongated between the first end 90 and the second end 92, and the first surface 94 is coupled to the back surface 80 of the panel 68. The rod 88 is aligned with the second lateral edge 76 of the panel 68 and the second end 92 is aligned with the top edge 70 of the panel 68. Moreover, the first end 90 is spaced from the bottom edge 72 of the panel 68.

Each of the fins 66 includes a coupler 96 that is coupled to the first end 90 of the rod 88. The coupler 96 is fastened to the second shaft 52 such that the rod 88 is oriented to extend along an axis is oriented at an obtuse angle with a rotational axis of the second shaft 52. The coupler 96 is concavely arcuate with respect to the rod 88 thereby facilitating the coupler 96 to conform to the curvature of the second shaft 52. The coupler 96 may have a fastener slot 98 extending therethrough to accommodate a fastener that engages the second shaft 52 for retaining the rod 88 on the second shaft 52.

The bend on the panel 68 corresponding to each of the fins 66 rests against the front surface 78 of the panel 68 of an adjacent one of the fins 66. Additionally, the second portion 86 of the panel 68 corresponding to each of the fins 66 extends forwardly from the front surface 78 of the panel 68 of the adjacent fin 66. In this way a pocket 100 is formed between the front surface 78 of the panel 68 of a respective fin 66 and the back surface 80 of an adjacent fin 66. The pocket 100 enhances the force harnessed from the wind to increase efficiency of the plurality of fins 66. Each of the fins 66 and the rod 88 may be comprised of a sufficiently light weight material to satisfy efficiency requirements and a sufficiently rigid material to satisfy strength requirements.

A plurality of light emitters 102 is provided and each of the light emitters 102 is coupled to the front surface 78 of the panel 68 of a respective one of the fins 66. A power supply 104 is coupled to the stand 12 and the power supply 104 is electrically coupled to the plurality of light emitters 102. The power supply 104 may comprise at least one rechargeable battery and a solar panel for charging the at least one rechargeable battery. The plurality of light emitters 102 may include a control circuit thereby facilitating the light emitters 102 to be turned on the emit light in any predetermined arrangement for the purposes of advertising.

In use, the stand 12 is positioned at the selected area such that the fins 66 are exposed to the wind. The rotatable support element 14 is rotated into the direction of the wind when the wind blows against the fins 66. Additionally, the fins 66 are rotated once the rotatable support element 14 is aligned with the direction of the wind for turning the generator 62 to produce electrical energy. The conical shape formed by the fins 66 reduces the likelihood that a bird will fly into the fins 66 compared to the likelihood of bird strikes on traditional wind turbines.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A conical wind turbine assembly for harnessing wind power to produce electrical energy, said assembly comprising:
   a stand being positionable in an area known for regularly occurring windy conditions, said stand including a rotatable supporting element, said rotatable supporting element being rotatable around said stand wherein said rotatable element is configured to be aligned with a direction of the wind;
   a generator being coupled to said stand, said generator being in mechanical communication with said rotatable supporting element; and
   a plurality of fins, each of said fins being coupled to said rotatable supporting element wherein each of said fins is configured to be exposed to the wind, each of said fins radiating around said rotatable supporting element wherein said fins are configured to capture the wind thereby rotating said fins, each of said fins being oriented to angle outwardly and away from said rotatable supporting element such that said plurality of fins forms a cone, each of said fins being in mechanical communication with said generator such that said generator is rotated when said fins are rotated wherein said generator is configured to convert wind energy into electrical energy;
   wherein said stand comprises:
      a ring having a top side and an inwardly facing side, said ring being positionable to lie on a support surface; and
      a plurality of supports, each of said supports being coupled to said inwardly facing side of said ring, each of said supports extending across a full diameter of said ring for supporting a circular shape of said ring, each of said supports intersecting each other at a center point of said ring;
   and
   wherein said rotatable supporting element comprises:
      a first gear box being coupled to said supports, said first gear box being aligned with said center point of said ring, said first gear box having an input gear and an output gear, said input gear having a rotational axis being oriented perpendicular to a rotational axis of said output gear;
      a first tube having a lower end and an upper end, said lower end engaging said first gear box such that said first tube is vertically oriented; and
      a first shaft being rotatably positioned within said first tube, said first shaft rotatably engaging said input gear of said first gear box.

2. The assembly according to claim 1, wherein said rotatable supporting element comprises:
   a second gear box being coupled to said upper end of said first tube, said second gear box having an input gear and an output gear, said input gear of said second gear box having a rotational axis being oriented perpendicular to a rotational axis of said output gear of said second gear box, said first shaft engaging said output gear of said second gear box such that said first gear box is in mechanical communication with said second gear box;
   a second tube having a front end and a back end, said back end engaging said second gear box such that said second tube is horizontally oriented; and
   a second shaft being rotatably positioned within said second tube, said second shaft rotatably engaging said input gear of said second gear box such that said second shaft is in mechanical communication with said first shaft.

3. The assembly according to claim 2, wherein said rotatable supporting element includes a pair of legs, each of said legs being coupled to and extending downwardly from said second tube, each of said legs having a distal end with respect to said second tube, each of said legs angling away from said second tube such that said distal end of each of said legs is aligned with said top side of said ring.

4. The assembly according to claim 3, further comprising a pair of rollers, each of said rollers being rotatably coupled to said distal end of a respective one of said legs, each of said rollers engaging said top side of said ring such that said first tube and said second tube are rotatable about said center point of said ring.

5. The assembly according to claim 1, wherein said generator has an input shaft, said input shaft engaging said output gear of said first gear box such that said first gear box rotates said generator wherein said generator is configured to produce said electrical energy.

6. The assembly according to claim 1, wherein each of said fins comprises a panel having a top edge, a bottom edge, a first lateral edge, a second lateral edge, a front surface and a back surface, said panel being elongated between said top edge and said bottom edge, said bottom edge having a length being less than a length of said top edge such that said panel has a wedge shape.

7. The assembly according to claim 6, wherein said panel has a bend extending between said top edge and said bottom edge, said bend being spaced from said first lateral edge to define a first portion of said panel forming an angle with a second portion of said panel.

8. The assembly according to claim 7, wherein said front surface of said panel is concavely arcuate.

9. The assembly according to claim 7, wherein said bend on said panel corresponding to each of said fins rests against said front surface of said panel of an adjacent one of said fins, such that said second portion of said panel corresponding to each of said fins extends forwardly from said front surface of said panel of said adjacent fin.

10. The assembly according to claim 6, wherein each of said fins includes a rod having a first end, a second end and a first surface extending between said first end and said second end, said rod being elongated between said first end and said second end, said first surface being coupled to said back surface of said panel, said rod being aligned with said second lateral edge of said panel, said second end being aligned with said top edge of said panel, said first end being spaced from said bottom edge of said panel.

11. The assembly according to claim 10, wherein:
   said rotatable supporting element includes a first shaft and a second shaft; and
   each of said fins includes a coupler being coupled to said first end of said rod, said coupler being fastened to said second shaft such that said rod is oriented to extend along an axis being oriented at an obtuse angle with a rotational axis of said second shaft, said obtuse angle being the angle at which each of said fins is angled outwardly and away from said rotatable supporting element, said coupler being concavely arcuate with respect to said rod thereby facilitating said coupler to conform to the curvature of said second shaft.

12. A conical wind turbine assembly for harnessing wind power to produce electrical energy, said assembly comprising:
- a stand being positionable in an area known for regularly occurring windy conditions, said stand including a rotatable supporting element, said rotatable supporting element being rotatable around said stand wherein said rotatable element is configured to be aligned with a direction of the wind, said stand comprising:
  - a ring having a top side and an inwardly facing side, said ring being positionable to lie on a support surface; and
  - a plurality of supports, each of said supports being coupled to said inwardly facing side of said ring, each of said supports extending across a full diameter of said ring for supporting a circular shape of said ring, each of said supports intersecting each other at a center point of said ring;
- said rotatable supporting element comprising:
  - a first gear box being coupled to said supports, said first gear box being aligned with said center point of said ring, said first gear box having an input gear and an output gear, said input gear having a rotational axis being oriented perpendicular to a rotational axis of said output gear;
  - a first tube having a lower end and an upper end, said lower end engaging said first gear box such that said first tube is vertically oriented;
  - a first shaft being rotatably positioned within said first tube, said first shaft rotatably engaging said input gear of said first gear box;
  - a second gear box being coupled to said upper end of said first tube, said second gear box having an input gear and an output gear, said input gear of said second gear box having a rotational axis being oriented perpendicular to a rotational axis of said output gear of said second gear box, said first shaft engaging said output gear of said second gear box such that said first gear box is in mechanical communication with said second gear box;
  - a second tube having a front end and a back end, said back end engaging said second gear box such that said second tube is horizontally oriented;
  - a second shaft being rotatably positioned within said second tube, said second shaft rotatably engaging said input gear of said second gear box such that said second shaft is in mechanical communication with said first shaft;
  - a pair of legs, each of said legs being coupled to and extending downwardly from said second tube, each of said legs having a distal end with respect to said second tube, each of said legs angling away from said second tube such that said distal end of each of said legs is aligned with said top side of said ring; and
  - a pair of rollers, each of said rollers being rotatably coupled to said distal end of a respective one of said legs, each of said rollers engaging said top side of said ring such that said first tube and said second tube are rotatable about said center point of said ring;
- a generator being coupled to said stand, said generator being in mechanical communication with said rotatable supporting element, said generator having an input shaft, said input shaft engaging said output of said first gear box such that said first gear box rotates said generator; and
- a plurality of fins, each of said fins being coupled to said rotatable supporting element wherein each of said fins is configured to be exposed to the wind, each of said fins radiating around said rotatable supporting element wherein said fins are configured to capture the wind thereby rotating said fins, each of said fins being oriented to angle outwardly and away from said rotatable supporting element such that said plurality of fins forms a cone, each of said fins being in mechanical communication with said generator such that said generator is rotated when said fins are rotated wherein said generator is configured to convert wind energy into electrical energy, each of said fins comprising:
  - a panel having a top edge, a bottom edge, a first lateral edge, a second lateral edge, a front surface and a back surface, said panel being elongated between said top edge and said bottom edge, said bottom edge having a length being less than a length of said top edge such that said panel has a wedge shape, said panel having a bend extending between said top edge and said bottom edge, said bend being spaced from said first lateral edge to define a first portion of said panel forming an angle with a second portion of said panel, said front surface of said panel being concavely arcuate;
  - a rod having a first end, a second end and a first surface extending between said first end and said second end, said rod being elongated between said first end and said second end, said first surface being coupled to said back surface of said panel, said rod being aligned with said second lateral edge of said panel, said second end being aligned with said top edge of said panel, said first end being spaced from said bottom edge of said panel; and
  - a coupler being coupled to said first end of said rod, said coupler being fastened to said second shaft such that said rod is oriented to extend along an axis being oriented at an obtuse angle with a rotational axis of said second shaft, said obtuse angle being the angle at which each of said fins is angled outwardly and away from said rotatable supporting element, said coupler being concavely arcuate with respect to said rod thereby facilitating said coupler to conform to a curvature of said second shaft; and
- wherein said bend on said panel corresponding to each of said fins rests against said front surface of said panel of an adjacent one of said fins, such that said second portion of said panel corresponding to each of said fins extends forwardly from said front surface of said panel of said adjacent fin.

\* \* \* \* \*